(12) United States Patent
Ziegler

(10) Patent No.: US 9,187,201 B2
(45) Date of Patent: Nov. 17, 2015

(54) APPARATUS AND METHOD FOR THE TREATMENT OF CONTAINERS WITH RECOGNITION OF FITTINGS

(75) Inventor: Manfred Ziegler, Passau (DE)

(73) Assignee: KRONES AG (DE)

( * ) Notice: Subject to any disclaimer, the term of this patent is extended or adjusted under 35 U.S.C. 154(b) by 358 days.

(21) Appl. No.: 12/958,388

(22) Filed: Dec. 1, 2010

(65) Prior Publication Data

US 2011/0192704 A1 Aug. 11, 2011

(30) Foreign Application Priority Data

Dec. 14, 2009 (DE) .......................... 10 2009 058 086

(51) Int. Cl.
*B65G 47/244* (2006.01)
*B65G 29/00* (2006.01)
*B65G 47/24* (2006.01)
*B65G 19/02* (2006.01)
*B65G 43/08* (2006.01)
*B65C 9/40* (2006.01)
*B29C 49/42* (2006.01)
*B29C 49/78* (2006.01)
*B67B 3/26* (2006.01)
*B67C 3/00* (2006.01)

(52) U.S. Cl.
CPC . *B65C 9/40* (2013.01); *B29C 49/42* (2013.01); *B29C 49/78* (2013.01); *B67B 3/26* (2013.01); *B67C 3/007* (2013.01)

(58) Field of Classification Search
None
See application file for complete search history.

(56) References Cited

U.S. PATENT DOCUMENTS

| 4,072,117 A | * | 2/1978 | Plaessmann | ........... B21D 51/42 198/394 |
| 5,058,724 A | * | 10/1991 | Hinton | .................... B65C 9/067 198/376 |
| 5,419,866 A | * | 5/1995 | Valyi | ....................... B29C 49/18 264/521 |
| 6,213,025 B1 | * | 4/2001 | Sauerwein | ........... B65G 1/0414 104/121 |

(Continued)

FOREIGN PATENT DOCUMENTS

| CN | 1554067 A | 12/2004 |
| CN | 101443651 A | 5/2009 |

(Continued)

OTHER PUBLICATIONS

Search Report from counterpart European Patent Application No. 10 19 4446, dated Mar. 22, 2011.

(Continued)

*Primary Examiner* — Kavel Singh
(74) *Attorney, Agent, or Firm* — Hayes Soloway P.C.

(57) ABSTRACT

An apparatus for the treatment of containers may include at least one conveying device, which conveys the containers along a pre-set conveying path, and at least one treatment device, which treats the container in a pre-determined manner. The apparatus may include at least one size part which is capable of being arranged in an exchangeable manner on a carrier. A first transmitter device, which at least intermittently emits a signal which is characteristic of the first transmitter device, is arranged on the size part, and the apparatus has at least one first receiver device for receiving the first signal. The apparatus may further include a second signal communication device, which emits or receives a second characteristic signal, wherein the receiver device is designed in such a way that it determines from the signals emitted whether the size part is in a predetermined position with respect to the apparatus.

26 Claims, 1 Drawing Sheet

(56) References Cited

U.S. PATENT DOCUMENTS

| | | | |
|---|---|---|---|
| 6,688,465 B2* | 2/2004 | Arends | B65B 21/04 |
| | | | 206/427 |
| 6,971,506 B2* | 12/2005 | Hassinen | G01N 35/04 |
| | | | 198/803.14 |
| 2003/0047475 A1 | 3/2003 | Arends et al. | |
| 2005/0022470 A1 | 2/2005 | Focke et al. | |
| 2005/0194705 A1 | 9/2005 | Smith | |
| 2007/0163697 A1 | 7/2007 | Kursawe | |
| 2009/0316145 A1 | 12/2009 | Widera | |
| 2011/0192704 A1 | 8/2011 | Ziegler | 198/341.01 |

FOREIGN PATENT DOCUMENTS

| | | | |
|---|---|---|---|
| DE | 199 41 485 A1 | 10/2000 | |
| DE | 103 23 308 | 2/2005 | B29C 45/64 |
| DE | 601 18 636 | 8/2006 | B65C 9/06 |
| DE | 10 2005 059 312 A1 | 6/2007 | |
| DE | 10 2006 051 533 | 4/2008 | B65B 57/00 |
| DE | 10 2007 025 521 A1 | 12/2008 | |
| DE | 10 2008 012 757 | 9/2009 | B29C 49/42 |
| GB | 0 744 224 | 3/1996 | B08B 9/46 |
| WO | 03/025833 A1 | 3/2003 | |
| WO | 2005/068301 A1 | 7/2005 | |
| WO | 2008/145345 A1 | 12/2008 | |

OTHER PUBLICATIONS

First Office Action from counterpart Chinese Patent Application No. 2010105874085, dated Mar. 27, 2013 (with English-language translation).

Chinese Office Action dated Jul. 18, 2014, issued in corresponding Chinese Application No. 2010105874085.

European Communication and Opposition, including Annexes, Appln. No. 10194446.0-1707/2332846 dated Mar. 27, 2015 (no English translation available) (26 pgs).

* cited by examiner

APPARATUS AND METHOD FOR THE TREATMENT OF CONTAINERS WITH RECOGNITION OF FITTINGS

CROSS-REFERENCE TO RELATED APPLICATION

This application claims the benefit of priority of German Patent Application No. 10 2009 058 086.7, filed Dec. 14, 2009, pursuant to 35 U.S.C. 119(a)-(d), the disclosure of which is incorporated herein by reference.

TECHNICAL FIELD

The present disclosure relates to an apparatus and a method for the treatment of containers and, more particularly, to an apparatus and method for the treatment of containers with recognition of fittings.

BACKGROUND

Apparatuses and methods of this type have long been known from the prior art and they comprise in this case for example apparatus for labelling containers, apparatus for filling containers, apparatus for shaping pre-forms of plastics material into containers, apparatus for producing packs of containers, palletizers and the like.

In this case, size parts, which can be exchanged in order to treat different types of containers for example, are frequently used in machines of this type. In addition, size parts of this type can be replaced in the event of wear. When size parts are replaced in this way, many factors have to be taken into consideration. In this way, it is necessary to ensure that use is made of a size part which is adapted to the apparatus itself. In addition, it is also necessary to ensure, however, that the size part is arranged on the apparatus in the proper manner and is also mounted for example at the correct location inside a plant. In this way, systems should be produced which permit a reliable recognition of change-over parts and fittings or size parts, in which case this recognition can also, in particular, be dependent upon the type of the container.

In the prior art of the Applicants' company a flexible scanning of the size parts is carried out in part in this case by means of a hand-held reading device. In this case it is not possible to prevent size parts, which are not assembled or made ready and which for their part are not involved in the direct set-up procedure, from also being scanned in certain cases as a result of the large radius of action of the hand-held reading device.

It may be desirable, therefore, to ensure or to provide a greater guarantee that the size part in question will also actually be fitted at its correct location.

SUMMARY

According to various aspects of the disclosure, an apparatus for the treatment of containers has at least one conveying device which conveys the containers along a pre-set conveying path. In addition, at least one treatment device is provided, which treats the container in a predetermined manner. The apparatus includes at least one size part which is capable of being arranged or can be arranged in an exchangeable manner on the apparatus or a carrier of this apparatus respectively.

According to the disclosure, a first transmitter device, which at least intermittently emits a signal which is characteristic of this transmitter device (and thus also of the size part in question), is arranged on the size part. In addition, the apparatus has at least one first receiver device for receiving the first signal, and, in addition, the apparatus has a second transmitter device which emits a second characteristic signal, the receiver device being designed in such a way that it determines from the signals emitted whether the size part is in a pre-determined position with respect to the apparatus.

The communication device may comprise a further transmitter device, so that the term "second transmitter device" is also used in particular below.

This ensures that the correct size part will be arranged or detected respectively at the correct position. The receiver device can also be for example a portable appliance which can read out the corresponding first transmitter device and optionally also the second transmitter device. In this case the first transmitter device emits the signal, for example, wirelessly, and in particular not only in a pre-determined direction but also in a pre-determined range.

It may be desirable for the second transmitter device to be arranged stationary with respect to the apparatus. In this case it is possible for this second transmitter device to be installed so as to be fixed with the apparatus or to be arranged in an inseparable manner on the latter, so that in particular it cannot be removed from the apparatus without material damage. It may also be desirable if the first transmitter device is arranged fixed on the size part and, in an exemplary manner, if it cannot be removed from the size part without material damage. It would also be possible, however, for the second transmitter device also to be arranged on the size part and to detect for example whether the size part is arranged correctly on the apparatus, and whether for example a locking mechanism which fixes the size part on the apparatus is correctly closed.

In the case of a further exemplary embodiment the receiver device has a time-detection device which determines a time interval between two signals of the two transmitter devices received by it. In this way it is possible for a set-up procedure to be assessed as valid only if the signal of the size part to be removed and the second transmitter device—installed in a fixed manner—are scanned within a defined time frame. In addition, it is possible that the two transmitter devices can be present in the close range of one receiver appliance and can be scanned jointly. This likewise ensures a correct arrangement, i.e. the correct positioning of the size part. On account of the procedure according to the disclosure it is also possible to prevent an improper use of the detection device or the receiver device and—as mentioned—also to scan the second transmitter devices in addition to the first transmitter devices, in order to start, in this way during the reading procedure, a monitoring procedure which will prevent the scanning of change-over parts which have not been correctly installed.

It may be desirable for the receiver device to have a comparator device which accepts two received signals of the two transmitter devices only if the signals arrive within a pre-determined time window, which is also optionally capable of being varied. In this way it is possible for example for the receiver device to be set in such a way that the two signals emitted by the transmitter devices have to arrive within a time window which is less than 100 ms. In this way, a detection of the position and also a detection of the product, i.e. a detection of the size part, also take place in an independent manner.

In the case of a further exemplary embodiment the signal emitted by the second transmitter device is capable of being detected only in a pre-set geometrical range of the apparatus. This can be for example the close transmission range of an RFID tag.

It may be desirable for an RFID tag to be used as the second transmitter device. It would also be possible, however, for the second transmitter device to be optical, acoustic or other transmitter devices, the signals of which can be scanned only in a specified pre-set range. It would also be possible for the second transmitter device to be a specified area of the machine or a support which the user or for example the receiver device has to touch, so as to ensure in this way that the receiver device is present in a pre-set geometrical area. In this way, the expression "the second transmitter device" should be understood in this context as meaning that any signal is emitted, in which case this can be the closure of a circuit for example with touch-sensitive plant components in a simple case.

It would also be possible, in addition to or instead of the second transmitter device, for a receiver device to be provided which receives a corresponding second signal and to permit the change-over procedure only if such a signal is received.

It may be desirable for the first transmitter device to be an RFID-based transmitter device. In this way it is possible for an RFID tag which in particular can be read out by means of the receiver device to be arranged on the size part. It may be desirable for the first transmitter device to be an externally supplied transmitter device which can be activated for example by means of an aerial in order to emit the corresponding signals as a result.

In the case of a further exemplary embodiment the treatment device is selected from a group of devices which includes shaping devices for shaping plastics-material preforms into plastics-material containers, filling devices for filling containers, labelling devices for labelling containers, closure devices for closing containers, conveying devices for conveying the containers, and the like. The corresponding size parts can be for example rail parts for conveying the containers, blow moulds, stretch rods, blow-moulding nozzles, and the like.

In the case of a further exemplary embodiment the first transmitter device communicates with the second transmitter device. In this way it is possible for example for the second transmitter device to emit a signal, and only when the latter has been detected by the first transmitter device does the latter likewise emit a corresponding signal. In this way it is possible to ensure that the first transmitter device is arranged in a close range of the second transmitter device. In addition, it would also be possible for the second transmitter device to emit an activation pulse which only activates the first transmitter device. In this way it is possible to ensure that the first transmitter device can emit signals only when it is in a specified range of the second transmitter device.

In addition, the present disclosure relates to a method of operating an apparatus for the treatment of containers, in which an exchangeable size part which is necessary for operating the apparatus is mounted or arranged on the plant and in which a signal which is emitted by a first transmitter device is received by means of a receiver device, this transmitter device being arranged on the size part, and this signal being characteristic of the size part.

According to the disclosure a second signal is emitted or received by a second transmitter device, and on the basis of the second signal it is determined whether the size part is in a pre-determined position with respect to the apparatus.

The expression "determination on the basis of the second signal" is to be understood as meaning that this second signal or a signal derived from it is used in at least one step of the set-up procedure in order to ensure that the size part is arranged on the correct area of the plant.

It may be desirable for the signals to be independent of each other, which means in particular that signals are emitted independently of each other. It may be desirable for the second transmitter device or the signal communication device to be arranged not on the size part but preferably in a fixed manner on the apparatus.

In the case of a further exemplary method a time interval between the two signals is detected. In this way it is again possible for the first transmitter device first to be activated and then for a check to be made as to whether the two signals have arrived in the receiver device in a pre-set time window. In addition, it would also be possible for the transmitter device to be designed in such a way that they communicate with each other, which means that it would be possible for the transmitter devices in question, which may be equipped as RFID tags, to be used as a master/slave combination. In addition, it would also be possible for these two transmitter devices to be connected in an electrically conductive manner or to be coupled to each other in an inductive, capacitive or optical manner.

On account of the method according to the disclosure it is therefore also possible to designate size parts in the position for insertion and to prevent erroneous setting-up and possibly also an improper reading of the transmitter device or tag. In this case it would also be possible for the transmitter devices to be arranged at positions on the apparatus with difficult access, for example inside a blow mould, and the information is transferred by means of coupling through the blow-mould carrier, in which case it may be desirable for the blow-mould carrier in turn to have a write/read head at an accessible position.

Some further advantages and embodiments may become evident from the attached drawings.

DETAILED DESCRIPTION

Figure 1:
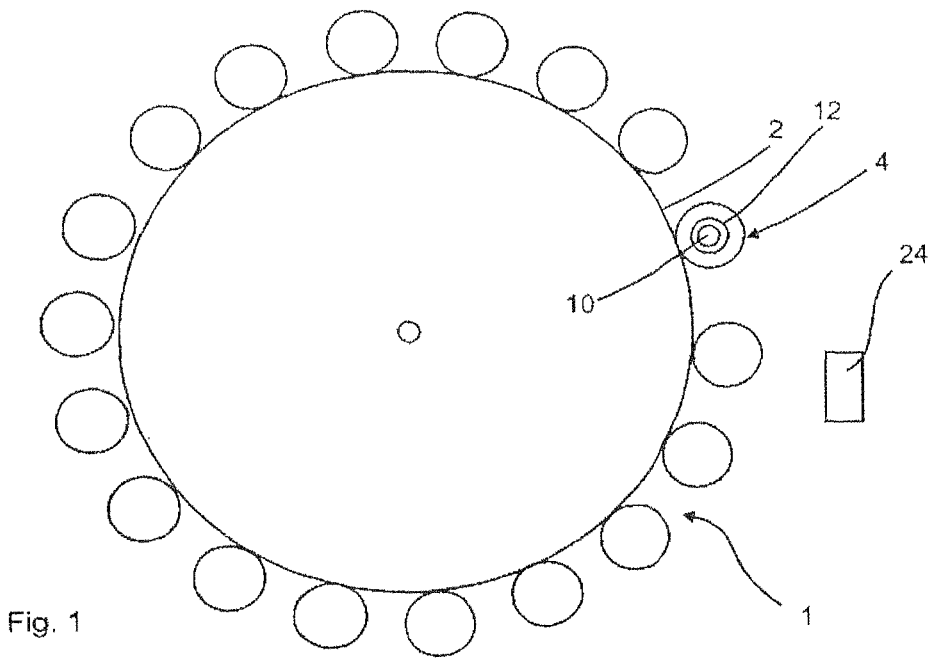
FIG. 1 is a diagrammatic illustration of an exemplary apparatus for the treatment of containers according to the disclosure.

FIG. 1 shows an example of a use of the presently-disclosed apparatus. In this case the reference number 1 designates an apparatus for the shaping of plastics-material preforms into plastics-material containers, such as for example a stretch blow-moulding machine. It is mentioned at this point, however, that the invention can also be used in the case of other machines in the field of the beverage-producing industry, in which size parts have to be exchanged. The size parts can be widely varying components, such as for example blow moulds, rail guides, stretch rods, and the like.

In this case the apparatus 1 has a conveying device 2 in order to convey the containers 10 (illustrated diagrammatically). This conveying device is a blow-moulding wheel 2 on which a plurality of treatment devices 4 in the form of blow-moulding stations 4 are arranged. In this case each blow-moulding station 4 has blow-mould carriers on which in turn exchangeable blow moulds 12 are arranged. These blow moulds are the exchangeable size parts which can be exchanged in a manner dependent for example upon the container to be expanded. The reference number 24 designates a receiver device (for example mobile) for receiving signals (for example a hand-held reading appliance).

Figure 2:
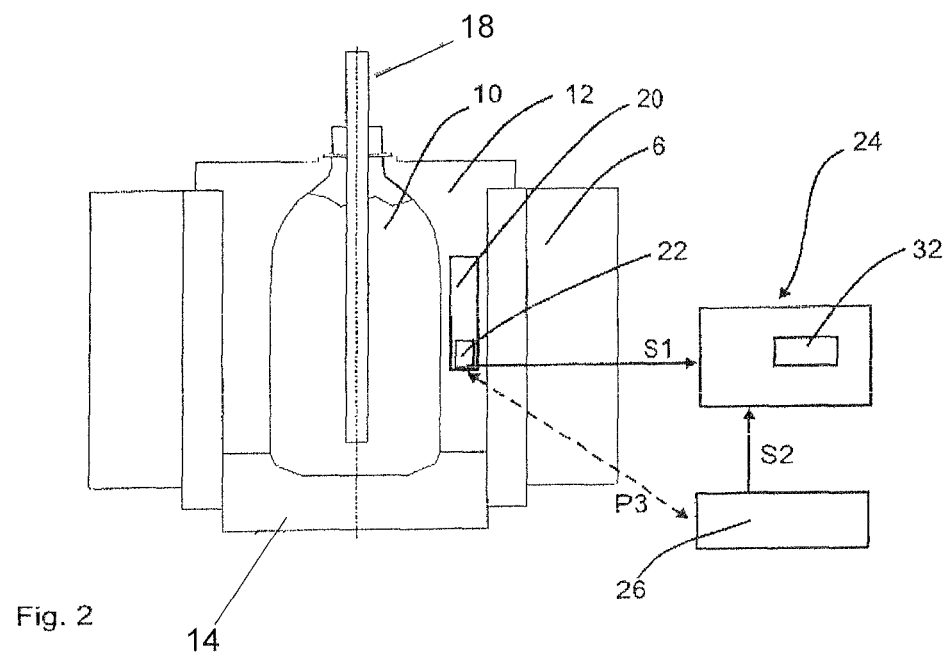
FIG. 2 is a combination diagrammatic/schematic illustration of an exemplary apparatus according to the disclosure.

FIG. 2 is a diagrammatic illustration to explain the presently-disclosed apparatus. Here, too, the size part 12 or the blow mould is again evident, which is arranged on a blow-mould carrier 6. Here the size part is constructed in a plurality of parts and has two lateral parts and a base part 14. In this case it would be possible for all these parts to have transmitting devices in each case, but it would also be possible, however, for only one of these transmitting devices 22 to be provided.

This transmitting device 22 is situated on a carrier designated 20 in its entirety, such as for example an RFID tag. This transmitting device is capable of emitting a specified signal S1 which is characteristic of this transmitting device 22 and thus also of the respective size part 12 and clearly identifies the latter.

In this case, this signal S1 is delivered to the receiver device 24 so that it is possible to identify which size part is present in each case. The receiver device can have means known from the prior art, such as for example aerials, in order to activate the transmitting device 22 or the entire RFID tag 20. The reference number 18 designates a stretch rod for stretching the containers.

The reference number 26 designates a further signal communication device which may be likewise advantageously arranged on the apparatus or even on a frame in a fixed manner. This signal communication device may include a further transmitting device, which likewise delivers a signal S2 to the receiver device 24.

The reference number 32 designates a time-detection unit which for example can determine a time interval of the two signals S1 and S2. Only if this time value does not reach a specified threshold value is it possible to deduce from this not only that has the correct size part 12 emitted the signal but also that it is arranged on the correct carrier 6 and is not present for example at the wrong place. The second signal communication device can likewise be an RFID tag which can also be activated by the receiver device 24 so as thus to emit a clearly identifiable signal S2.

It can thus be provided that the two transmitting devices 22 and 26 have to be situated in the close range of the receiver device 24 in order to be jointly scanned. This also ensures, as mentioned, a correct arrangement, i.e. the correct positioning. In addition, the second transmitting device could also be situated on the blow-mould carrier 6 and could itself in turn scan a signal of the first transmitting device 22.

It would also be possible, however, for the second communication device to be arranged on the size part 12 and for example to scan a correct locking situation with respect to the blow-moulding carrier. In a corresponding manner a signal of this type can also be delivered again to the receiver device 24, so as to ensure that the correct size part is arranged on the correct carrier 6.

In addition, it is also possible for the first transmitting device 22 and the second signal communication device 26 to communicate with each other (arrow P3), so that for example the signal communication device also delivers a signal to the transmitting device 22 and the latter in turn delivers the signal to the receiver device in reaction thereto. In particular, however, the first transmitting device 22 and the signal communication device 26 are independent of each other so as to ensure that a signal S2 is not also regularly delivered in reaction to a signal S1.

It will be apparent to those skilled in the art that various modifications and variations can be made to the apparatus and method for the treatment of containers with recognition of fittings of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. An apparatus for the shaping of plastics material pre-forms into plastics-material containers, comprising
    at least one conveying device including a carrier, which conveys the plastics-material pre-forms along a pre-set conveying path;
    at least one shaping station, which treats the plastics-material pre-forms in a pre-determined manner,
    at least one exchangeable size part which is capable of being arranged in an exchangeable manner on the carrier, the exchangeable size part being adapted to a shape of the containers;
    the carrier carrying the at least one exchangeable size part;
    a first transmitter device arranged on the exchangeable size part, which at least intermittently emits a signal which is characteristic of the first transmitter device;
    at least one first receiver device for receiving the first signal, wherein the at least one first receiver device is not in mechanical contact with the containers; and
    a second signal communication device, which emits or receives a second characteristic signal, the first receiver device being designed in such a way that it determines from the first and second signals emitted whether the exchangeable size part arranged on the carrier is in a pre-determined position with respect to the apparatus.

2. An apparatus according to claim 1, wherein the second signal communication device includes a second transmitter device arranged stationary with respect to the apparatus.

3. An apparatus according to claim 1, wherein the first receiver device has a time-detection device, which determines a time interval between two signals received by the time-detection device.

4. An apparatus according to claim 1, wherein the signal emitted by the second signal communication device is capable of being detected only in a pre-set geometrical range of the apparatus.

5. An apparatus according to claim 1, wherein the first transmitter device is an RFID-based transmitter device.

6. An apparatus according to claim 1, further comprising filling devices for filling containers, labelling devices for labelling containers, closure devices for closing containers, and conveying devices for conveying the containers.

7. An apparatus according to claim 1, wherein the first transmitter device communicates with the second transmitter device.

8. A method of operating an apparatus for the shaping of plastics-material pre-forms into plastics-material containers, comprising:
    arranging an exchangeable size part on a carrier on a conveying device, the exchangeable size part being adapted to a shape of the containers, the exchangeable size part being necessary for operating the apparatus;
    receiving a signal, which is emitted by a first transmitter device, by means of a receiver device, the first transmitter device being arranged on the different size exchangeable part, and the received signal is characteristic of the different size exchangeable part, wherein the receiver device is not in mechanical contact with the containers; and
    determining, from a second signal emitted by a second transmitter device, whether the exchangeable size part is in a pre-determined position with respect to the apparatus.

9. A method according to claim 8, wherein the first and second signals are emitted independently of each other.

10. A method according to claim 8, further comprising detecting a time interval between the first and second signals.

11. An apparatus for the shaping of plastics-material pre-forms with plastics-material containers, comprising
- at least one conveying device including a carrier configured to convey the plastics-material pre-forms along a pre-set conveying path;
- at least one shaping station configured to treat the plastics-material pre-forms in a pre-determined manner,
- at least exchangeable one size part capable of being arranged in an exchangeable manner on the carrier, the exchangeable size part being adapted to a shape of the containers;
- a transmitter device arranged on the exchangeable size part, the transmitter device at least intermittently emitting a first signal which is characteristic of the transmitter device;
- a receiver device for receiving the first signal, wherein the receiver device is not in mechanical contact with the containers; and
- a signal communication device, the signal communication device including at least one of a second transmitter device and a second receiver device, the signal communication device being configured to at least one of emit and receive a second characteristic signal, the receiver device being designed in such a way that it determines from the first and second emitted signals whether the exchangeable size part arranged on the carrier is in a pre-determined position with respect to the apparatus.

12. An apparatus according to claim 11, wherein the signal communication device includes a second transmitter device arranged stationary with respect to the apparatus.

13. An apparatus according to claim 11, wherein the receiver device includes a time-detection device, the time detection device being configured to determine a time interval between the first and second signals received by the time-detection device.

14. An apparatus according to claim 11, wherein the signal emitted by the signal communication device is detectable only in a pre-set geometrical range of the apparatus.

15. An apparatus according to claim 11, wherein the transmitter device is an RFID-based transmitter device.

16. An apparatus according to claim 11, further comprising filling devices for filling containers, labelling devices for labelling containers, closure devices for closing containers, and conveying devices for conveying the containers.

17. An apparatus according to claim 11, wherein the transmitter device communicates with the second transmitter device.

18. An apparatus according to claim 1, wherein the second signal communication device comprises a second transmitting device.

19. An apparatus according to claim 18, wherein the second transmitting device is a wireless transmitting device.

20. An apparatus for the shaping of plastics-material pre-forms into plastics-material containers, comprising
- at least one conveying device including a carrier, which conveys the containers along a pre-set conveying path;
- at least one shaping station, which treats the plastics-material pre-forms in a pre-determined manner;
- at least one exchangeable size part which is capable of being arranged in an exchangeable manner on the carrier, the exchangeable size part being adapted to a shape of the containers;
- a first transmitter device arranged on the exchangeable size part, which at least intermittently emits a signal which is characteristic of the first transmitter device;
- at least one first receiver device for receiving the first signal, wherein the at least one first receiver device is not in mechanical contact with the containers; and
- a second signal communication device, which emits or receives a second characteristic signal, the first receiver device being designed in such a way that it determines from the first and second signals emitted whether the exchangeable size part arranged on the carrier is in a pre-determined position with respect to the apparatus,
- wherein the first and second signals are emitted independently of each other.

21. An apparatus according to claim 2, wherein the second transmitter device is arranged on the exchangeable size part.

22. An apparatus according to claim 2, wherein the second transmitter device detects whether the exchangeable size part is arranged correctly on the apparatus.

23. An apparatus according to claim 2, wherein the second transmitter device detects whether a locking mechanism which fixes the exchangeable size part the apparatus is closed.

24. An apparatus according to claim 1, wherein the exchangeable size part comprises exchangeable parts selected from the group consisting of a rail part for conveying at least one of the containers, a blow mould, a stretch rod, and a blow-moulding nozzle.

25. An apparatus according to claim 1, wherein the first receiver device comprises a mobile receiver device that receives signals from a reading appliance.

26. An apparatus for the shaping of plastics-material pre-forms with plastics material containers, comprising
- at least one conveying device including a carrier, which conveys the containers along a pre-set conveying path;
- at least one shaping station, which treats the plastics-material pre-forms in a pre-determined manner;
- at least one exchangeable size part which is capable of being arranged in an exchangeable manner on the carrier, the exchangeable size part being adapted to a shape of the containers;
- the carrier carrying the at least one exchangeable size part;
- a first transmitter device arranged on the exchangeable size part, which at least intermittently emits a signal which is characteristic of the first transmitter device;
- at least one first receiver device for receiving the first signal, wherein the at least one first receiver device is not in mechanical contact with the containers, and wherein the at least one first receiver device is a mobile receiver device that receives signals from a reading appliance; and
- a second signal communication device, which emits or receives a second characteristic signal, the first receiver device being designed in such a way that it determines from the first and second signals emitted whether the exchangeable size part arranged on the carrier is in a pre-determined position with respect to the apparatus.

* * * * *